(12) United States Patent
Taylor et al.

(10) Patent No.: US 8,485,089 B2
(45) Date of Patent: Jul. 16, 2013

(54) MICROWAVE COFFEE MAKER

(75) Inventors: Curtis Taylor, Chagrin Falls, OH (US);
Doug Whitner, Chagrin Falls, OH (US);
Brian Sokol, Vermilion, OH (US); Brian Catlett, Shaker Heights, OH (US)

(73) Assignee: Innovation Direct LLC, Cleveland, OH (US)

( * ) Notice: Subject to any disclaimer, the term of this patent is extended or adjusted under 35 U.S.C. 154(b) by 548 days.

(21) Appl. No.: 12/712,376

(22) Filed: Feb. 25, 2010

(65) Prior Publication Data
US 2010/0218685 A1  Sep. 2, 2010

Related U.S. Application Data

(60) Provisional application No. 61/156,613, filed on Mar. 2, 2009, provisional application No. 61/173,697, filed on Apr. 29, 2009.

(51) Int. Cl.
*A47J 31/02* (2006.01)

(52) U.S. Cl.
USPC .............. 99/306; 99/323; 99/323.3; 99/279; 99/295; 99/304; 99/305; 99/322

(58) Field of Classification Search
USPC ............... 99/306, 323, 323.3, 279, 295, 304, 99/305, 322
See application file for complete search history.

(56) References Cited

U.S. PATENT DOCUMENTS

| | | | | |
|---|---|---|---|---|
| 2,732,787 A * | 1/1956 | Osborne | .......................... | 99/306 |
| 4,908,222 A * | 3/1990 | Yu | .................. | 426/241 |
| 5,826,493 A * | 10/1998 | Tien Lin | ........................ | 99/306 |
| 5,832,809 A * | 11/1998 | Gras | ................................ | 99/299 |
| 6,327,965 B1 * | 12/2001 | Lin Tien | ........................ | 99/299 |
| 2009/0056557 A1 * | 3/2009 | Lin | ................................ | 99/323 |
| 2010/0212509 A1 * | 8/2010 | Tien et al. | ........................ | 99/305 |

* cited by examiner

*Primary Examiner* — Benjamin Layno
(74) *Attorney, Agent, or Firm* — Fay Sharpe LLP

(57) ABSTRACT

A beverage maker that includes a container having a bottom wall, side wall extending upwardly from the bottom wall to foam a container cavity and a lid. The bottom wall includes a drain opening to enable liquid to drain from the container cavity. The lid is designed to be movable between an open and closed position. The lid forms a cover over a top of the container cavity. The lid includes a filter rib that extends partially into the container cavity when the lid is in a closed position. A drain plug is provided to control a flow of liquid through the drain opening.

20 Claims, 5 Drawing Sheets

MICROWAVE COFFEE MAKER

The present invention claims priority on U.S. Provisional Application Ser. Nos. 61/156,613 filed Mar. 2, 2009 and 61/173,697 filed Apr. 29, 2009, both of which are incorporated herein by reference.

The present invention is directed to a novel beverage maker that can be used in a microwave, and more particularly a microwaveable coffee maker.

BACKGROUND OF THE INVENTION

Instant beverages are very popular. Coffee is also a very popular beverage. Instant coffee products are available, but many coffee consumers want a fresh brewed cup of coffee. However, even when brewing four (4) cups of coffee, a significant amount of time is required and there is waste when the consumer only wants a single cup of coffee.

In view of the current state of the art, there is a need for a device that can quickly and conveniently brew 1-4 cups of coffee or tea.

SUMMARY OF THE INVENTION

The present invention is directed to a quick and convenient method and device to freshly brew beverages such as, but not limited to, coffee, tea and the like.

In one non-limiting aspect of the present invention, there is provided a microwave coffee and tea maker that includes a container having a bottom wall, a side wall that extends upwardly from the bottom wall to form a container cavity, and a lid. The bottom wall includes one or more drain openings to enable liquid to drain from the container cavity. The lid is designed to be movable between an open and closed position. The lid forms a cover over a top of the container cavity. The lid includes one or more vapor openings to enable steam that forms in the container cavity to escape from the container cavity. The lid includes a filter rib that extends partially into the container cavity when the lid is in a closed position. The microwave coffee and tea maker also includes a liquid filter that is removably positionable in the container cavity. The liquid filter forms a coffee granule cavity. The liquid filter is designed to inhibit or prevent coffee granules in the coffee granule cavity from passing through the liquid filter and through the drain opening. The liquid filter is generally a paper disposable filter; however, this is not required. The filter rib on the lid is designed to engage a top portion of the liquid filter when the lid is in the closed position so as to inhibit or prevent coffee granules in the coffee granule cavity from passing over a top edge of the liquid filter when water and coffee granules in the coffee granule cavity are heated in a microwave. The microwave coffee and tea maker also includes a drain plug that is designed to control a flow of liquid through the drain opening. The drain plug includes a stem portion that extends through the drain opening and is movable within the drain opening. The stem portion includes a sealing element that is connected to a top end of the stem portion. The sealing element is designed to form a liquid seal with a top portion of the drain opening when the stem portion is in a downward seal position to inhibit or prevent liquid from flowing through the drain opening. The sealing element is designed to be spaced above the top portion of the drain opening when the stem is in an upward draining position to enable liquid to flow through the drain opening.

In another and/or alternative aspect of the present invention, the drain plug is naturally movable to the downward seal position by gravity; however, this is not required.

In still another and/or alternative aspect of the present invention, the drain plug is movable to the downward seal position by a spring arrangement.

In yet another and/or alternative aspect of the present invention, the bottom of the container includes a cup plate cavity that is designed to contain a cup plate; however, this is not required. A bottom of the cup plate is designed to engage a top rim of a coffee cup; however, this is not required. The cup plate includes a plate opening to enable liquid to flow through the drain opening and to pass through the plate opening and into a coffee cup; however, this is not required. The bottom portion of the stem portion is connected to the cup plate; however, this is not required. The cup plate is designed to move upwardly and downwardly in the cup plate cavity; however, this is not required. The cup plate is designed to cause the sealing element to form a liquid seal with the top portion of the drain opening when the cup plate moves to a downward position and to cause the sealing element to be spaced above the top portion of the drain opening when the cup plate moves to an upward position; however, this is not required.

In still yet another and/or alternative aspect of the present invention, the cup plate cavity has a bottom edge; however, this is not required. The cup plate is spaced above the bottom edge of the cup plate cavity when the cup plate is in a full downward position; however, this is not required. The cup plate is designed to move farther above the bottom edge of the cup plate cavity when the cup plate moves to a full upward position; however, this is not required.

In another and/or alternative aspect of the present invention, there is provided a removable filter base that is positionable in the container cavity; however, this is not required. A top surface of the filter base is generally flat and planar and is designed to support a base of the liquid filter when the liquid filter is positioned in the container cavity; however, this is not required. The filter base includes a slot and/or an opening to allow liquid to flow through the filter base; however, this is not required.

In still another and/or alternative aspect of the present invention, there is provided a heat dissipating element on a handle of the container; however, this is not required.

In yet another and/or alternative aspect of the present invention, wherein the filter rib is angled outwardly to facilitate in engaging the top portion of said liquid filter; however, this is not required.

One non-limiting object of the present invention is to provide a coffee and tea maker that can brew coffee or tea in a microwave.

Another and/or alternative non-limiting object of the present invention is to provide a coffee and tea maker that can quickly and conveniently brew one to four cups of coffee or tea in a microwave.

These and other objects of the present invention will become readily apparent upon further review of the following specification and drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF THE NON-LIMITING EMBODIMENT

Figure 1:
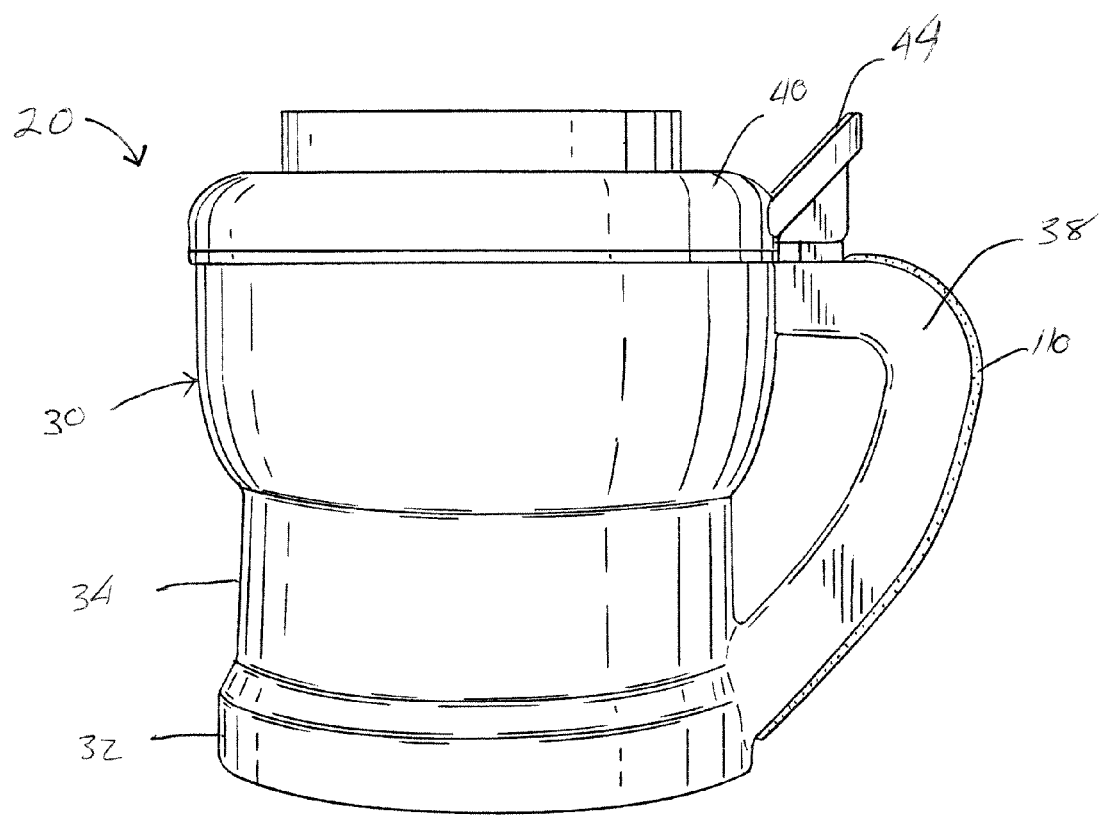
FIG. 1 is a side view of one non-limiting embodiment of a microwaveable beverage maker in accordance with the present invention.
Figure 2:
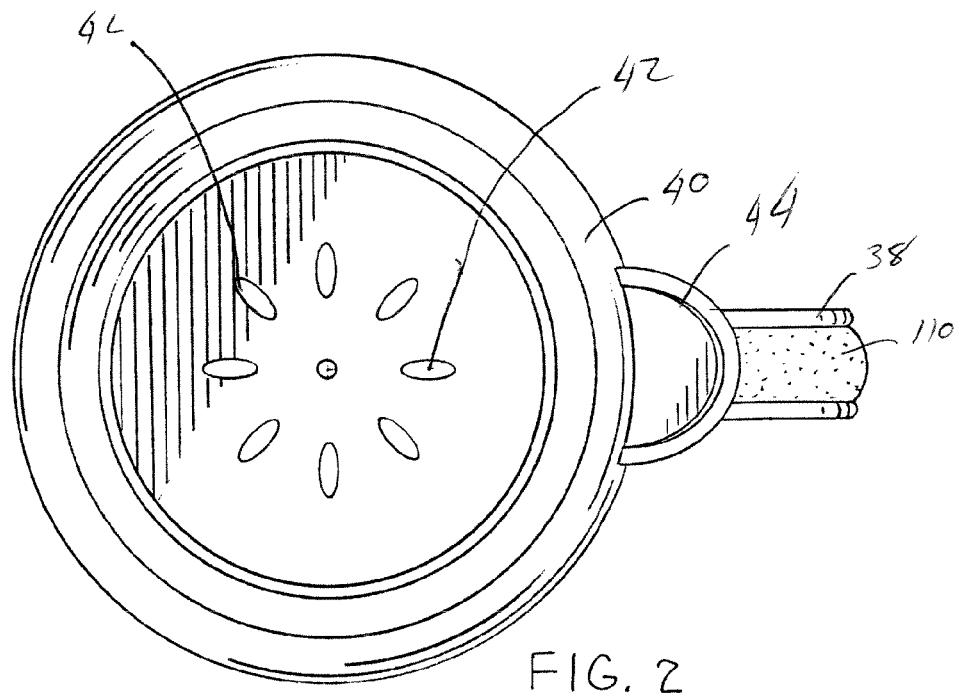
FIG. 2 is a top view of the microwaveable beverage maker of FIG. 1.
Figure 3:
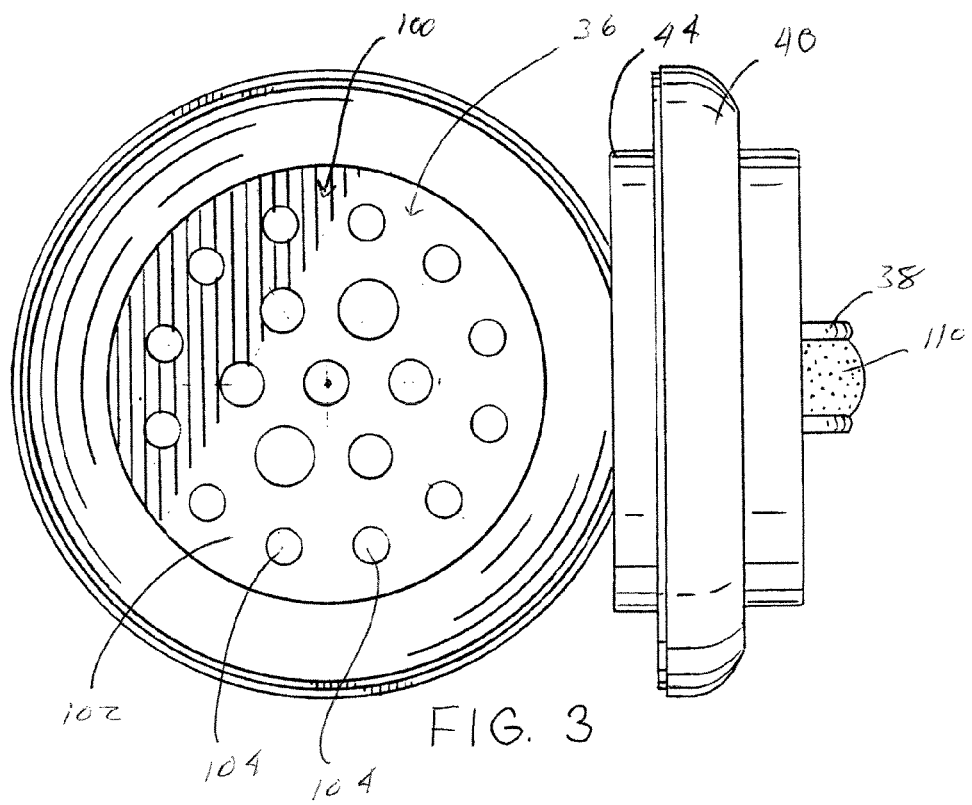
FIG. 3 is another top view of the microwaveable beverage maker of FIG. 1 wherein in the lid of the beverage make is in an open position.
Figure 4:
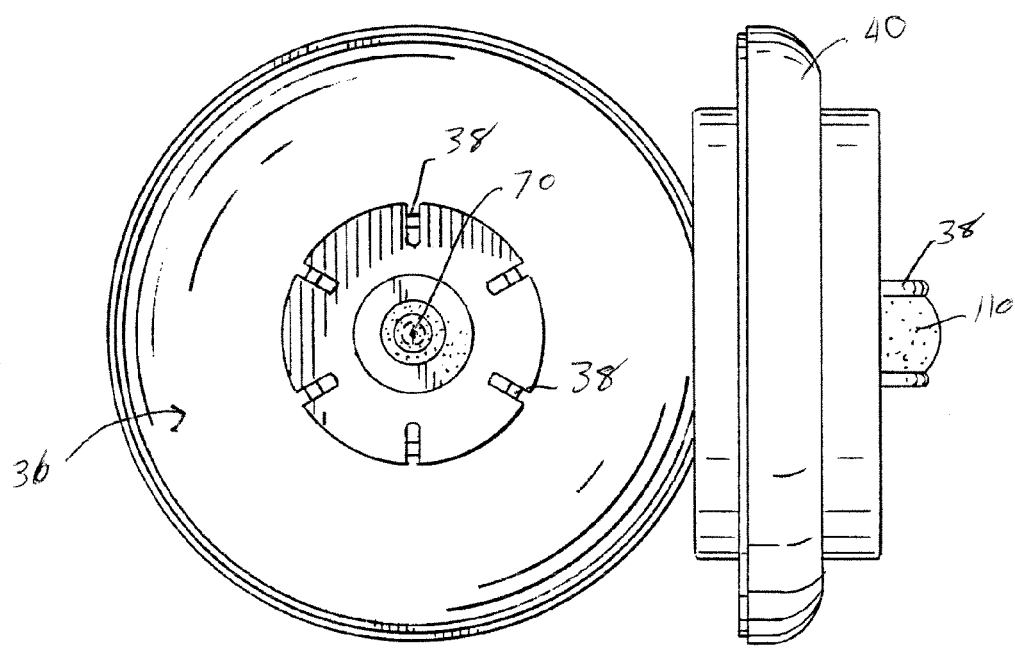
FIG. 4 is another top view of the microwaveable beverage maker of FIG. 1 wherein the lid of the beverage maker is in an open position and the filter base is removed.
Figure 5:
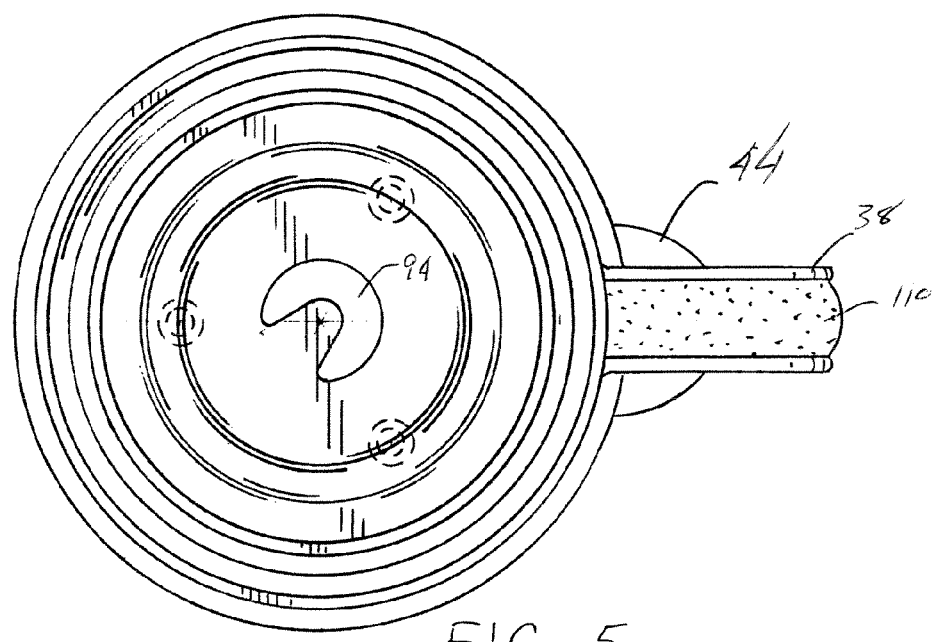
FIG. 5 is a bottom view of the microwaveable beverage maker of FIG. 1.
Figure 6:
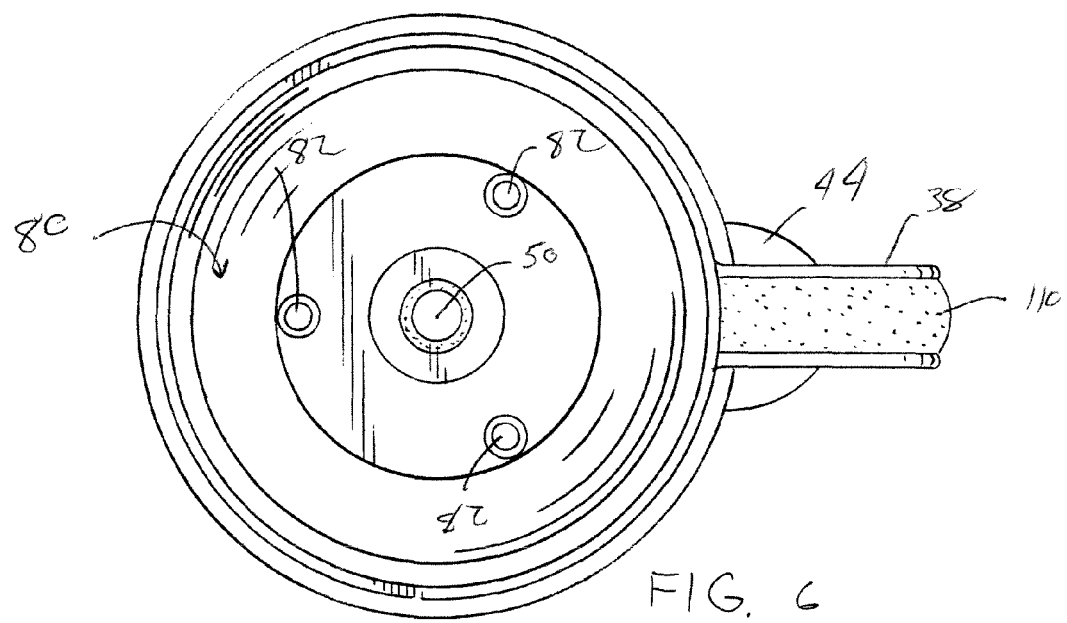
FIG. 6 is another bottom view of the microwaveable beverage maker of FIG. 1 wherein the cup plate is removed.

Referring now to the drawings wherein the showings are for the purpose of illustrating a non-limiting embodiment of the invention only and not for the purpose of limiting same, FIGS. 1-8 illustrate one non-limiting embodiment of the invention. FIGS. 1-8 illustrate a microwaveable beverage brewing device 20 that is designed to brew beverages such as coffee, tea and the like in a microwave. The microwaveable beverage brewing device 20 includes a container 30 that includes a bottom wall 32 and a side wall 34 that extends upwardly from the bottom wall to form a container cavity 36 within the container. On the side wall of the container, names, trademarks can be printed; however, this is not required. The container cavity has a generally conical shape; however, this is not required. The volume of the container cavity is generally designed to hold on to four cups of liquid, and typically about 1.5-3 cups of liquid; however, the container cavity can have other volumes. The materials that are used to form the components of the microwaveable beverage brewing device are non-limiting; however, the components are generally selected so that the microwaveable beverage brewing device can be safely used in a microwave. The microwaveable beverage brewing device 20 also includes a lid 40 that forms a closure over container cavity 36. Generally, the lid is hingedly connected to the side wall of the container by a hinge 46 to enable a user to move the lid between an open and closed position; however, it will be appreciated that the lid can be connected to the side wall of the container in other or additional ways or be designed to be completely removable from the container. The lid 40 can include a finger ledge 44 that is used to facilitate in the opening and/or closing of the lid; however, this is not required. The bottom wall includes one or more drain openings 50 to enable liquid to drain from the container cavity. In one non-limiting arrangement, the bottom wall includes one or more centrally located drain openings. The top portion of the drain opening can have a conical profile; however, this is not required. The lid also includes one or more vapor openings 42 to enable steam that forms in the container cavity to escape from the container cavity. The lid also includes a filter rib 44 that extends partially into the container cavity when the lid is in a closed position.

The microwaveable beverage brewing device 20 also includes a liquid filter, not shown, that is removably positionable in the container cavity. The liquid filter, not shown, is designed to form a coffee granule cavity. The liquid filter is also designed to inhibit or prevent coffee granules in the coffee granule cavity from passing through the liquid filter and through the drain opening. The liquid filter is generally a paper disposable filter; however, this is not required.

The filter rib 44 on the lid 40 is designed to engage a top portion of the liquid filter when the lid is in the closed position so as to inhibit or prevent coffee granules in the coffee granule cavity from passing over a top edge of the liquid filter when water and coffee granules in the coffee granule cavity are heated in a microwave. The filter rib is generally at least about 0.25 inches in width and typically about 0.5-1.5 inches in width; however, other widths can be used.

The microwaveable beverage brewing device 20 also includes a drain plug 70 that is designed to control a flow of liquid through the drain opening. The drain plug includes a stem portion 72 that extends through the drain opening and is movable within the drain opening. The stem portion 72 includes a sealing element 74 that is connected to a top end of the stem portion. The sealing element 74 is designed to form a liquid seal with a top portion of the drain opening when the stem portion is in a downward seal position, thereby inhibiting or preventing liquid from flowing through the drain opening. The sealing element is also designed to be movable to a position that is spaced above the top portion of the drain opening when the stem is in an upward draining position so as to enable liquid to flow through the drain opening. In one non-limiting design, when the top portion of the drain opening has a generally conical shape, the bottom portion of the sealing element has a corresponding shape so as to facilitate in forming a liquid seal when the sealing element engages the top portion of the drain opening. Generally the drain plug is naturally movable to a downward seal position by gravity; however, this is not required. Additionally or alternatively, the drain plug can be movable to the downward seal position by the use of a spring arrangement; however, this is not required. As will be described in more detail below, the stem and the sealing element are used to at least partially connect the cup plate to the bottom of container.

Figure 7:
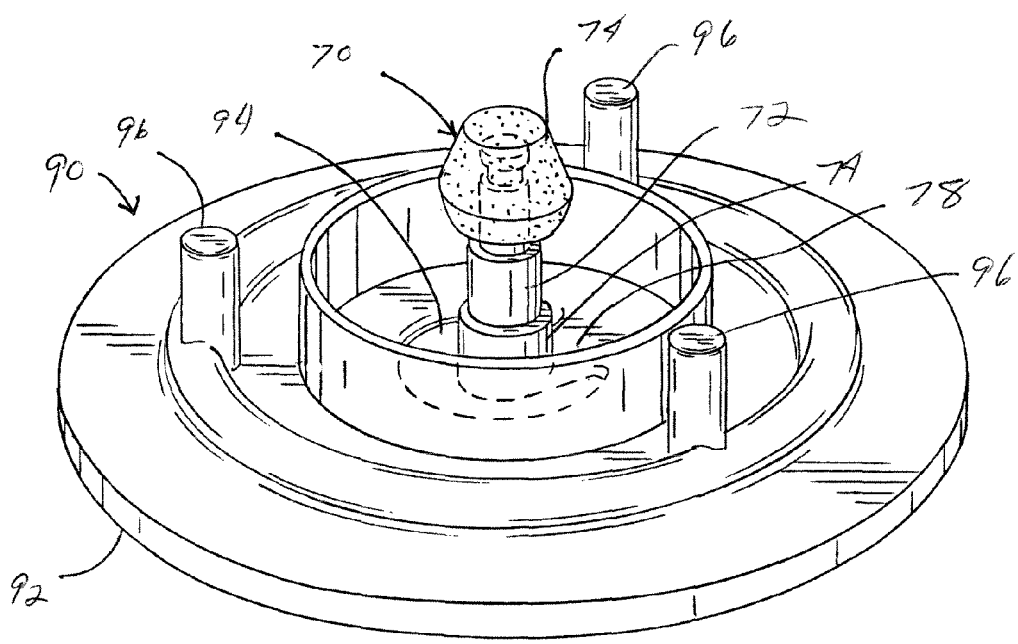
FIG. 7 is an elevation view of the cup plate.
Figure 8:
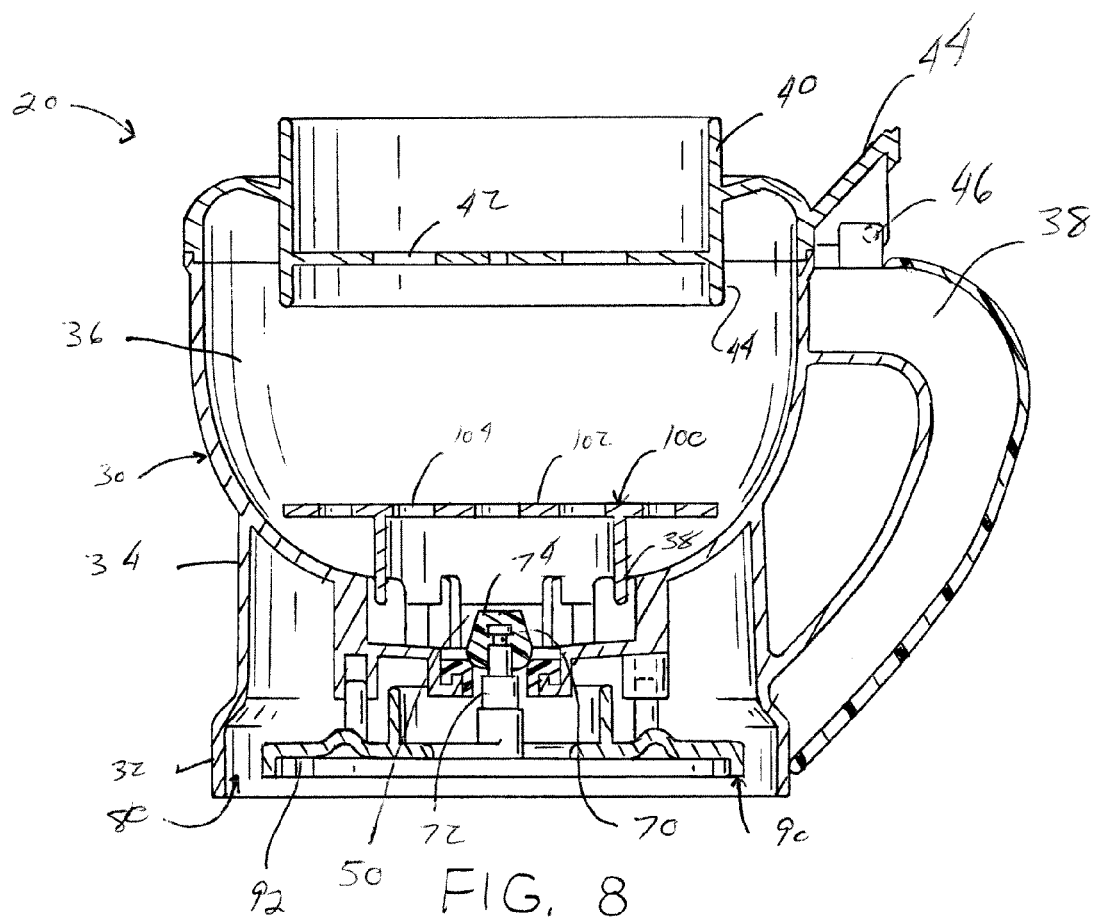
FIG. 8 is a cross-sectional view of the microwaveable beverage maker of FIG. 1

The microwaveable beverage brewing device 20 generally includes a cup plate cavity 80 that is positioned at the bottom portion of the container 30. Positioned within the cup plate cavity is a cup plate 90; however, this is not required. The bottom 92 of the cup plate 90 is designed to engage a top rim of a coffee cup when the microwaveable beverage brewing device is placed on top of a coffee cup, not shown; however, this is not required. The cup plate 90 generally includes one or more plate openings 94 that are designed to enable liquid to flow through the drain opening and to pass through the one or more plate openings and into the coffee cup; however, this is not required. The bottom portion of the stem portion 72 is connected to the cup plate; however, this is not required. The cup plate 90 is designed to move upwardly and downwardly within the cup plate cavity. The cup plate is designed to cause the sealing element to form a liquid seal with the top portion of the drain opening when the cup plate moves to a downward position, and to cause the sealing element to be spaced above the top portion of the drain opening when the cup plate moves to an upward position. The cup plate is generally moveably secured in the cup plate cavity to enable the cup plate to easily move up and down within the cup plate cavity. Many arrangements can be used. The cup plate can be designed such that the weight of the cup plate causes the cup plate to move downwardly so as to cause the sealing element to form a liquid seal with the drain opening; however, this is not required. The connection arrangement for the cup plate can be designed to limit rotational movement of the cup plate within the cup plate cavity; however, this is not required. Generally, the cup plate is movably secured to the cup plate cavity such that the bottom edge does not extend below the bottom edge of the cup plate cavity when the cup plate is positioned in the full downward position; however, this is not required. As illustrated in FIG. 7, the bottom portion 76 of the stem portion 72 is connected to a leg 78 that extends from one side of plate opening 94 of cup plate 90. The cup plate 90 includes three guide posts 96 that extend upwardly from the top surface of the cup plate. As can be appreciated, a greater or lesser number of guide posts can be used. The guide posts 96 are designed to be partially telescopically received into guide post openings 82 in the bottom of the cup plate cavity 80. The guide posts 96 and guide post openings 82 are designed to prevent or inhibit the rotation of the cup plate relative to container 30. As such guide posts 96 and guide post openings 82 limit the movement to the cup plate 90 to only upward and downward movement relative to the container 30. As such, rotational movement of the cup plate relative to the container is limited by the guide posts and guide post openings. The guide posts 96 and guide post openings 82 are generally not connected together, thus the only connection arrangement of the cup plate to the container is the arrangement of the sealing element 70, stem 72 on the cup plate 90 and the size of drain opening 50 in the container 30. As can be appreciated, cup plate 90 can be connected to container 30 in other or additional ways.

The cup plate 90 is designed to cause the sealing element 70 to form a liquid seal with the top portion of the drain opening 50 when the cup plate 90 moves to a downward position, and to cause the sealing element 70 to be spaced above the top portion of the drain opening 50 when the cup plate 90 moves to an upward position. The cup plate 90 is generally moveably secured in the cup plate cavity to enable the cup plate to easily move up and down within the cup plate cavity 80. The lower position of the cup plate is such that the cup plate does not move below the bottom edge of the cup plate cavity; however, this is not required. The cup plate 90 can be designed such that the weight of the cup plate 90 causes the cup plate to move downwardly so as to cause the sealing element to form a liquid seal with the drain opening; however, this is not required. The cup plate can be designed to have limited rotational movement within the cup plate cavity as discussed above; however, this is not required. Generally, the cup plate is movably secured to the cup plate cavity such that the bottom edge does not extend below the bottom edge of the cup plate cavity when the cup plate is positioned in the full downward position as discussed above; however, this is not required.

The cup plate is also generally designed to engage a top edge of a cup when the cup plate cavity is placed over and about the top edge of the cup. Generally, the cross-sectional shape and size of the lower portion of the cup plate cavity is greater than the cross-sectional size and shape of the cup so that the outer peripheral edge of the top edge of the cup fits inside the cup plate cavity and engages the bottom surface of the cup plate when the microwaveable beverage brewing device is placed on top of the cup. The weight of the microwaveable beverage brewing device causes the cup plate to move to the full upward position when the microwaveable beverage brewing device is placed on top of the cup. As discussed above, the upward movement of the cup plate causes the sealing element to move upwardly from the drain opening, thereby allowing liquid to pass through the drain opening and into the cup.

The microwaveable beverage brewing device 20 generally includes a removable filter base 100 that is positionable in the container cavity; however, this is not required. A top surface 102 of the filter base 100 is generally flat and planar and is designed to support a base of the liquid filter when the liquid filter is positioned in the container cavity; however, this is not required. The filter base includes one or more slots and/or openings 104 to allow for liquid to flow through the filter base; however, this is not required.

The microwaveable beverage brewing device 20 generally includes a removable filter base 100 that is positionable in the container cavity; however, this is not required. A top surface 102 of the filter base 100 is generally flat and planar and is designed to support a base of the liquid filter when the liquid filter is positioned in the container cavity; however, this is not required. The filter base includes one or more slots and/or openings 104 to allow for liquid to flow through the filter base; however, this is not required. One or more of openings 104 can be larger to enable a user to place a finger into the opening so as to facilitate in the removal or insertion of the filter base 100 into or out of the container cavity; however, this is not required. The container cavity 36 can include one or more side slots 38 that are designed to engage the bottom of the filter base and releasably secure the filter base to the container cavity; however, this is not required.

The microwaveable beverage brewing device 20 generally includes a heat dissipating element 110 that is connected on a handle 38 of container 30; however, this is not required. The heat dissipating element is designed to enable a user to conveniently grasp the handle of the container after a beverage has been brewed in the microwave without causing the user to be burned when removing the container from the microwave.

Although, the microwaveable beverage brewing device is described as brewing beverages in a microwave, this is not required. The microwaveable beverage brewing device is designed to be used with a common off-the-shelf coffee filter and standard coffee granules. In operation, a user first places a standard coffee filter inside the main cavity of the microwaveable beverage brewing device, secondly places standard coffee granules inside the coffee filter, and then finally fills the main cavity of the microwaveable beverage brewing device with water. Once the filter, coffee granules and water are inserted into the main cavity of the microwaveable beverage brewing device, the lid of the microwaveable beverage brewing device is closed and the microwaveable beverage brewing device is placed in a standard microwave. The fresh brewing of the coffee in the microwaveable beverage brewing device is accomplished in a few minutes by merely turning on the microwave. The unique filter retention arrangement of the microwaveable beverage brewing device inhibits or prevents coffee granules from boiling out of the coffee filter during the brewing of the coffee in the microwave. Once the coffee brewing is completed, the microwaveable beverage brewing device is removed from the microwave and placed on top of a container such as a coffee cup. The unique liquid dispenser arrangement of the microwaveable beverage brewing device is designed to enable the brewed coffee in the microwaveable beverage brewing device to simply drain into the coffee cup once the microwaveable beverage brewing device is placed on top of the coffee cup. After the freshly brewed coffee has drained from the microwaveable beverage brewing device, the user can simply dispose of the coffee filter and used coffee grounds and rinse off the microwaveable beverage brewing device for later use.

The microwaveable beverage brewing device includes a single container having a bottom wall, a side wall that extends upwardly from the bottom wall to form a container cavity, and a lid. The bottom wall includes only one drain opening to enable liquid to drain from the container cavity. The lid is movable between an open and closed position and forms a cover over a top of the container cavity. The container cavity is designed to receive a liquid filter that is removably positionable in the container cavity. The liquid filter is generally a paper disposable filter. The container cavity includes a drain plug that is designed to control a flow of liquid through the drain opening in the bottom of the container cavity. The drain plug includes a stem portion that extends through the drain opening and is movable within the drain opening. The stem portion includes a sealing element that is connected to a top end of the stem portion. The sealing element is designed to form a liquid seal with a top portion of the drain opening when the stem portion is in a downward seal position. The sealing element is also designed to be moved above the top portion of the drain opening when the stem is in an upward draining position to enable liquid to flow through the drain opening. The bottom of the single container includes a cup plate cavity that is designed to contain a cup plate. The bottom of the cup plate is designed to engage a top rim of a coffee cup when the microwaveable beverage brewing device is placed on top of the coffee cup. The cup plate includes a single plate opening located about the center of the cup plate to enable liquid that flows through the opening in the base of the container cavity to pass through the cup plate and into the coffee cup. At one side of the single opening is a stem arm that projects radially toward the center of the cup plate. At the end of the stem arm is a stem that projects upwardly from the arm. Located at the end of the stem is a sealing element. The cup plate is designed to move upwardly within the cup plate cavity when the cup plate engages a top rim of a coffee cup due to the microwaveable beverage brewing device being placed on top of the coffee cup. When the cup plate moves upwardly, the cup plate causes the sealing element to also move upwardly to the upward draining position thereby enabling liquid to flow through the drain opening of the container cavity and into the coffee cup.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A beverage maker comprising:
   a container having a bottom wall, side wall extending upwardly from said bottom wall to form a container cavity and a lid, said bottom wall including a drain opening to enable liquid to drain from said container cavity, said lid designed to be movable between an open and closed position, said lid forming a cover over a top of said container cavity, said lid including a filter rib that extends partially into said container cavity when said lid is in a closed position;
   a liquid filter that is removably positionable in said container cavity, said liquid filter forming a cavity, said liquid filter designed to inhibit or prevent materials in said cavity from passing through said liquid filter and through said drain opening, said filter rib on said lid designed to inhibit or prevent materials in said cavity from passing over a top edge of said liquid filter when water and said materials in said filter are heated while said lid is in a closed position; and,
   a drain plug designed to control a flow of liquid through said drain opening, said drain plug including a stem portion that extends through said drain opening and is movable within said drain opening, said stem portion including a sealing element connected to a top end of said stem portion, said sealing element designed to form a liquid seal with a top portion of said drain opening when said stem portion is in a downward seal position to inhibit or prevent liquid from flowing through said drain opening, said sealing element designed to be spaced above said top portion of said drain opening when said stem is in a upward draining position to enable liquid to flow through said drain opening.

2. The beverage maker as designed in claim 1, wherein said lid includes a vapor opening to enable steam that forms in said container cavity to escape from said container cavity.

3. The beverage maker as designed in claim 2, wherein said drain plug is naturally movable to said downward seal position by gravity.

4. The beverage maker as defined in claim 3, wherein said bottom of said container includes a cup plate cavity designed to contain a cup plate, a bottom of said cup plate designed to engage a top rim of a coffee cup, said cup plate including a plate opening to enable liquid flowing through said drain opening to pass through said plate opening and into a coffee cup, a bottom portion of said stem connected to said cup plate, said cup plate designed to move upwardly and downwardly in said cup plate cavity, said cup plate designed to cause said sealing element to form a liquid seal with said top portion of said drain opening when said cup plate moves to a downward position and to cause said sealing element to be spaced above said top portion of said drain opening when said cup plate moves to an upward position thereby allowing liquid to flow through said drain opening.

5. The beverage maker as defined in claim 4, wherein said cup plate cavity has a bottom edge, said cup plate spaced above said bottom edge of said cup plate cavity when said cup plate is in a full downward position, said cup plate designed to move farther above said bottom edge of said cup plate cavity when said cup plate moves to a full upward position.

6. The beverage maker as defined in claim 5, including a removable filter base that is positionable in said container cavity, a top surface of said filter base is generally flat and planar and is designed to support a base of said liquid filter when said liquid filter is positioned in said container cavity, said filter base including a slot, an opening, or combinations thereof to enable liquid to flow through said filter base.

7. The beverage maker as defined in claim 6, wherein said cup plate includes only one opening through said cup plate.

8. The beverage maker as defined in claim 7, wherein said cup plate includes at least one guide post designed to be telescopically received in a guide post opening in the bottom of said cup plate cavity, said at least one guide post and said guide post opening designed to limit rotational movement of said cup plate relative to said container when said cup plate moves upwardly and downwardly in said cup plate cavity.

9. The beverage maker as designed in claim 1, wherein said drain plug is naturally movable to said downward seal position by gravity.

10. The beverage maker as designed in claim 1, wherein said drain plug is movable to said downward seal position by a spring arrangement.

11. The beverage maker as defined in claim 1, wherein said bottom of said container includes a cup plate cavity designed to contain a cup plate, a bottom of said cup plate designed to engage a top rim of a coffee cup, said cup plate including a plate opening to enable liquid flowing through said drain opening to pass through said plate opening and into a coffee cup, a bottom portion of said stem connected to said cup plate, said cup plate designed to move upwardly and downwardly in said cup plate cavity, said cup plate designed to cause said sealing element to form a liquid seal with said top portion of said drain opening when said cup plate moves to a downward position and to cause said sealing element to be spaced above said top portion of said drain opening when said cup plate moves to an upward position thereby allowing liquid to flow through said drain opening.

12. The beverage maker as defined in claim 11, wherein said cup plate cavity has a bottom edge, said cup plate spaced above said bottom edge of said cup plate cavity when said cup plate is in a full downward position, said cup plate designed to move farther above said bottom edge of said cup plate cavity when said cup plate moves to a full upward position.

13. The beverage maker as defined in claim 1, including a removable filter base that is positionable in said container cavity, a top surface of said filter base is generally flat and planar and is designed to support a base of said liquid filter when said liquid filter is positioned in said container cavity, said filter base including a slot, an opening, or combinations thereof to enable liquid to flow through said filter base.

14. The beverage maker as defined in claim 1, including a heat dissipating element on a handle of said container.

15. The beverage maker as defined in claim 1, wherein said filter rib is angled outwardly to facilitate in engaging said top portion of said liquid filter.

16. The beverage maker as defined in claim 1, wherein said cup plate includes only one opening through said cup plate.

17. The beverage maker as defined in claim 1, wherein said cup plate includes at least one guide post designed to be telescopically received in a guide post opening in the bottom of said cup plate cavity, said at least one guide post and said guide post opening designed to limit rotational movement of said cup plate relative to said container when said cup plate moves upwardly and downwardly in said cup plate cavity.

18. A beverage maker comprising:
a container having a bottom wall, side wall extending upwardly from said bottom wall to form a container cavity and a lid, said bottom wall including a drain opening to enable liquid to drain from said container cavity, said lid designed to be movable between an open and closed position, said lid forming a cover over a top of said container cavity, said lid including a filter rib that extends partially into said container cavity when said lid is in a closed position, said filter rib designed to inhibit or prevent materials in said cavity from passing over a top edge of said liquid filter when water and said materials in said filter are heated while said lid is in a closed position, said lid including a vapor opening to enable steam that forms in said container cavity to escape from said container cavity;
a liquid filter that is removably positionable in said container cavity, said liquid filter forming a cavity, said liquid filter designed to inhibit or prevent materials in said cavity from passing through said liquid filter and through said drain opening;
a drain plug designed to control a flow of liquid through said drain opening, said drain plug including a stem portion that extends through said drain opening and is movable within said drain opening, said stem portion including a sealing element connected to a top end of said stem portion, said sealing element designed to form a liquid seal with a top portion of said drain opening when said stem portion is in a downward seal position to inhibit or prevent liquid from flowing through said drain opening, said sealing element designed to be spaced above said top portion of said drain opening when said stem is in an upward draining position to enable liquid to flow through said drain opening; and,
a cup plate at least partially positioned in a cup plate cavity located in said bottom of said container, a bottom of said cup plate designed to engage a top rim of a coffee cup, said cup plate including a plate opening to enable liquid flowing through said drain opening to pass through said plate opening and into a coffee cup, a bottom portion of said stem connected to said cup plate, said cup plate designed to move upwardly and downwardly in said cup plate cavity, said cup plate designed to cause said sealing element to form a liquid seal with said top portion of said drain opening when said cup plate moves to a downward position and to cause said sealing element to be spaced above said top portion of said drain opening when said cup plate moves to an upward position thereby allowing liquid to flow through said drain opening, said cup plate including a guide post that extends upwardly from a top surface of said cup plate, said guide post designed to be telescopically received in a guide post opening in the bottom of said cup plate cavity, said at least one guide post and said guide post opening designed to limit rotational movement of said cup plate relative to said container when said cup plate moves upwardly and downwardly in said cup plate cavity.

19. The beverage maker as defined in claim 18, including a removable filter base that is positionable in said container cavity, a top surface of said filter base is generally flat and planar and is designed to support a base of said liquid filter when said liquid filter is positioned in said container cavity, said filter base including a slot, an opening, or combinations thereof to enable liquid to flow through said filter base.

20. A beverage maker comprising:
a container having a bottom wall, a side wall extending upwardly from said bottom wall to form a container cavity and a lid, said bottom wall including a drain opening to enable liquid to drain from said container cavity, said lid designed to be movable between an open and closed position, said lid forming a cover over a top of said container cavity;
a liquid filter that is removably positionable in said container cavity, said liquid filter forming a cavity, said liquid filter designed to inhibit or prevent materials in said cavity from passing through said liquid filter and through said drain opening;
a drain plug designed to control a flow of liquid through said drain opening, said drain plug including a stem portion that extends through said drain opening and is movable within said drain opening, said stem portion including a sealing element connected to a top end of said stem portion, said sealing element designed to form a liquid seal with a top portion of said drain opening when said stem portion is in a downward seal position to inhibit or prevent liquid from flowing through said drain opening, said sealing element designed to be spaced above said top portion of said drain opening when said stem is in an upward draining position to enable liquid to flow through said drain opening; and,
a cup plate at least partially positioned in a cup plate cavity located in said bottom of said container, a bottom of said cup plate designed to engage a top rim of a coffee cup, said cup plate including a plate opening to enable liquid flowing through said drain opening to pass through said plate opening and into a coffee cup, a bottom portion of said stem connected to said cup plate, said cup plate designed to move upwardly and downwardly in said cup plate cavity, said cup plate designed to cause said sealing element to form a liquid seal with said top portion of said drain opening when said cup plate moves to a downward position and to cause said sealing element to be spaced above said top portion of said drain opening when said cup plate moves to an upward position thereby allowing liquid to flow through said drain opening, said cup plate including a guide post that extends upwardly from a top surface of said cup plate, said guide post designed to be telescopically received in a guide post opening in an interior top portion of said cup plate cavity, said at least one guide post and said guide post opening designed to limit rotational movement of said cup plate relative to said container when said cup plate moves upwardly and downwardly in said cup plate cavity, said cup plate cavity having a bottom edge, said cup plate spaced above said bottom edge of said cup plate cavity when said cup plate is in a full downward position, said cup plate designed to move upwardly from said bottom edge of said cup plate cavity when said cup plate moves to a full upward position.

* * * * *